US012792471B2

(12) United States Patent
Singhal et al.

(10) Patent No.: US 12,792,471 B2
(45) Date of Patent: Nov. 10, 2026

(54) FILE SERVER CLONE REFRESH OF FILE SYSTEMS AND VOLUMES

(71) Applicant: Dell Products L.P., Round Rock, TX (US)

(72) Inventors: Maneesh Singhal, Coquitlam (IN); Rvsmp Kumar, Bangalore (IN); Suhas Bk, Bangalore (IN); Adithi Gurunath, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/894,310

(22) Filed: Sep. 24, 2024

(65) Prior Publication Data

US 2026/0086902 A1 Mar. 26, 2026

(51) Int. Cl.
*G06F 11/1446* (2026.01)

(52) U.S. Cl.
CPC ...... *G06F 11/1461* (2013.01); *G06F 11/1451* (2013.01); *G06F 11/1464* (2013.01)

(58) Field of Classification Search
CPC ............................ G06F 11/14; G06F 11/1461
See application file for complete search history.

(56) References Cited

U.S. PATENT DOCUMENTS

| | | | | |
|---|---|---|---|---|
| 6,959,368 | B1 * | 10/2005 | St. Pierre | G06F 11/1448 714/E11.123 |
| 8,756,197 | B1 * | 6/2014 | Wilde | G06F 11/1451 707/610 |
| 9,396,205 | B1 * | 7/2016 | Lewis | G06F 16/182 |
| 10,498,821 | B1 * | 12/2019 | Bono | G06F 11/1458 |
| 2018/0121453 | A1 * | 5/2018 | Jain | G06F 11/1448 |
| 2018/0341593 | A1 * | 11/2018 | Adams | G06F 16/50 |
| 2021/0182162 | A1 * | 6/2021 | Kohli | G06F 11/1464 |
| 2024/0045964 | A1 * | 2/2024 | Bednash | G06F 21/566 |

* cited by examiner

*Primary Examiner* — Bryce P Bonzo
*Assistant Examiner* — Sean Kevin Mcnamara
(74) *Attorney, Agent, or Firm* — Amin, Turocy & Watson, LLP

(57) ABSTRACT

File server clone refresh of file systems and volumes (e.g., using a computerized tool), is enabled. For example, a system can comprise at least one processor, and at least one memory that stores executable instructions that, when executed by the at least one processor, facilitate performance of operations. The operations can comprise, in response to a determination that a first file server is to be cloned to a second file server, determining changed files between the first file server and the second file server, and determining configuration changes, applicable to the first file server, relative to a prior cloning of the first file server, in response to determining the changed files, applying changes corresponding to the changed files to the second file server, and in response to determining the configuration changes, applying the configuration changes to the second file server.

20 Claims, 17 Drawing Sheets

500b

FILE SERVER CLONE REFRESH OF FILE SYSTEMS AND VOLUMES

BACKGROUND

In a storage system, a file server is an entity which binds a set of file systems or volumes. The file server holds common configurations, such as configurations relating to network file systems (NFS), server message blocks (SMB), network information services (NIS), domain name systems (DNS), etc., for all the associated file systems or volumes.

The above-described background relating to file systems and volumes is merely intended to provide a contextual overview and is not intended to be exhaustive. Other contextual information may become further apparent upon review of the following detailed description.

DETAILED DESCRIPTION

Figure 1:
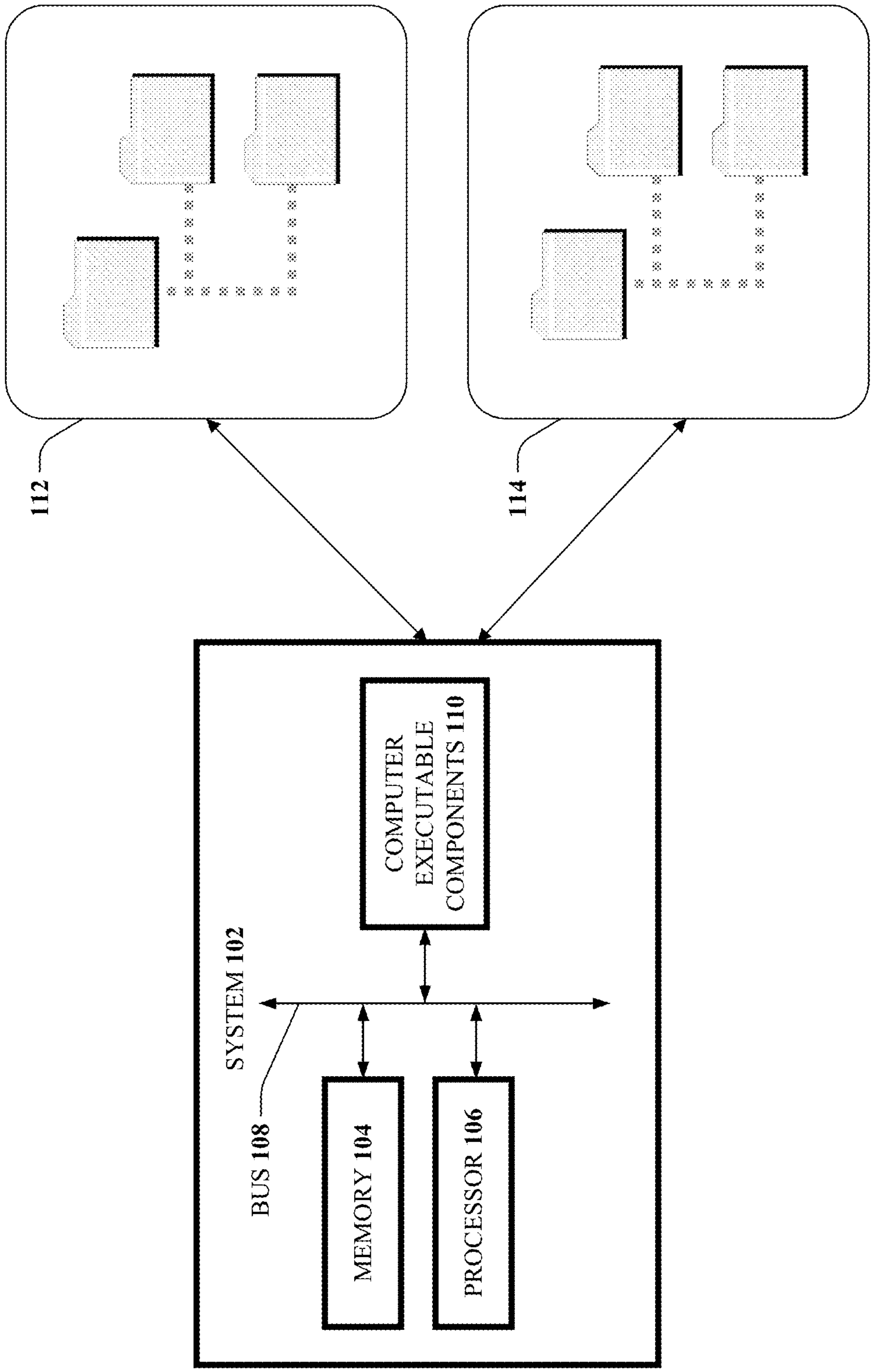
FIG. 1 is a block diagram of a non-limiting example system in accordance with one or more example embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned in the background, a clone of a file server permits users to access or possess a copy of all the file systems and common configuration. With existing solutions, however, if a user wishes to obtain the latest changes (e.g., configuration changes) from the original file server, the only method to obtain the latest changes is to perform a fresh clone and re-configure the clone with configuration information, such as lightweight directory access protocol (LDAP), SMB/NFS credentials, shares/export mappings etc. The foregoing is inefficient and expensive for users if such users need or want the latest changes on the clone from a parent file server.

Accordingly, file server clone refresh of file systems and volumes can be improved in various ways, and various embodiments are described herein to this end and/or other ends.

According to an example embodiment, a system can comprise at least one processor, and at least one memory that stores executable instructions that, when executed by the processor, facilitate performance of operations, comprising, in response to a determination that a first file server is to be cloned to a second file server, determining changed files between the first file server and the second file server, and determining configuration changes, applicable to the first file server, relative to a prior cloning of the first file server, in response to determining the changed files, applying changes corresponding to the changed files to the second file server, and in response to determining the configuration changes, applying the configuration changes to the second file server.

In one or more example embodiments, the determination that the first file server is to be cloned to the second file server can comprise a determination that the first file server is to be identically cloned to the second file server, and the applying of the configuration changes to the second file server can comprise replacing a second configuration of the second file server with a first configuration of the first file server.

In one or more example embodiments, the determination that the first file server is to be cloned to the second file server can comprise a determination that the first file server is to be non-identically cloned to the second file server, and the applying of the configuration changes to the second file server can comprise merging a second configuration of the second file server with a first configuration of the first file server.

In one or more example embodiments, the configuration changes can comprise lightweight directory access protocol configuration changes, server message block configuration changes, network file system configuration changes, or share or export mapping configuration changes.

In one or more example embodiments, the second file server can comprise a cloned version of the first file server.

In one or more example embodiments, the above operations can further comprise generating a snapshot of the second file server, wherein the second file server is restored from the snapshot in response to a determination that the applying of the changes corresponding to the changed files to the second file server or the applying of the configuration changes to the second file server resulted in an error. In this regard, the error can comprise a complete failure of the second file server.

In one or more example embodiments, the configuration changes can comprise client access configuration changes.

In one or more example embodiments, the second file server can comprise multiple copies of the first file server.

In one or more example embodiments, the second file server can comprise an immutable golden copy of the first file server.

In another example embodiment, a non-transitory machine-readable medium can comprise executable instructions that, when executed by a processor, facilitate performance of operations, comprising, in response to a determination that a first network attached storage server is to be copied to a second network attached storage server, determining changed files between the first network attached storage server and the second network attached storage server, and determining configuration changes, applicable to the first network attached storage server, relative to a prior copying of the first network attached storage server, in response to determining the changed files, applying changes corresponding to the changed files to the second network attached storage server, and in response to determining the configuration changes, applying the configuration changes to the second network attached storage server.

In one or more example embodiments, the determination that the first network attached storage server is to be copied to the second network attached storage server can comprise a determination that the first network attached storage server is to be identically copied to the second network attached storage server, and the applying of the configuration changes to the second network attached storage server can comprise replacing a second configuration of the second network attached storage server with a first configuration of the first network attached storage server.

In one or more example embodiments, the determination that the first network attached storage server is to be copied to the second network attached storage server can comprise a determination that the first network attached storage server is to be non-identically copied to the second network attached storage server, and the applying of the configuration changes to the second network attached storage server can comprise merging a second configuration of the second network attached storage server with a first configuration of the first network attached storage server.

In one or more example embodiments, the configuration changes can comprise at least one of lightweight directory access protocol configuration changes, server message block configuration changes, network file system configuration changes, or share or export mapping configuration changes.

In one or more example embodiments, the second network attached storage server can comprise an exact copy of the first network attached storage server.

In yet another example embodiment, a method can comprise, in response to a determination that a first file server is to be cloned to a second file server, determining, by a system comprising a processor, changed files between the first file server and the second file server, and determining, by the system, configuration changes, applicable to the first file server, relative to a prior cloning of the first file server, in response to determining the changed files, applying, by the system, changes corresponding to the changed files to the second file server, and in response to determining the configuration changes, applying, by the system, the configuration changes to the second file server.

In one or more example embodiments, the above method can further comprise generating, by the system, a snapshot of the second file server, wherein the second file server is restored from the snapshot in response to a determination that the applying of the changes corresponding to the changed files to the second file server or the applying of the configuration changes to the second file server resulted in an error. In this regard, the error can comprise a partial failure of the second file server.

In one or more example embodiments, the configuration changes can comprise client access configuration changes.

In one or more example embodiments, the second file server can comprise at least two copies of the first file server.

Example embodiments herein enable a process for adding and/or merging changes to/with a cloned file server, from an original file server, quickly and efficiently. File servers herein can store, for instance, groups of respective file systems or volumes. In this regard, the organization of data on a file server herein can comprise file systems and/or volumes. Volumes herein can be used, for instance, for virtual machines and/or to store various forms of data. Example embodiments herein enable refreshing of the cloned file server (e.g., a second file server) from the source file server (e.g., the original file server or first file server), such that all the changes from the source file server are made to the cloned file server without having to perform a copy of the entire data (e.g., delta is copied to clone). Such refreshing herein can comprise, for instance, creation of an exact replica of a source file server, copied to a cloned file server (e.g., for backup, disaster recovery, scaling, migration, etc.). So, while the data on corresponding file systems are refreshed from the source file server, configurations changes on the cloned file server (SMB Server credentials, LDAP, shares/exports, access control lists (ACLs), Interface IPs etc.) are retained and merged with the refreshed configuration from the source file server, thereby reducing user intervention with respect to re-configuration. A refresh of the cloned file server can thus be performed seamlessly, without an impact on the source file server.

In various example embodiments, a refresh of a file server can comprise performing a delta copy of data from source file systems/volumes to cloned file systems/volumes. Performing such a delta copy can comprise, for instance, copying data in which only the differences (e.g., deltas) between the source file server and cloned file server are transferred, rather than copying all files each time. Along with data copy, the refresh also comprises copying the configuration from source file server to clone file server. During a configuration copy, the existing configuration on clone can be retained and merged with a source configuration. The retaining of the configuration and the merging can be user driven, for instance, based on the option that user selects during the refresh process (e.g., via a graphical user interface (GUI) herein).

In various example embodiments, at refresh, a user can select (e.g., via a GUI herein) whether to make an identical or non-identical copy of source file server to cloned file server.

When the identical option is selected or determined (e.g., via a system 102 later described herein):

- The configuration and the data on the cloned file server are entirely overwritten, for instance, by the source configuration and data, while not retaining the configuration changes on the clone. In various example embodiments, this process can be utilized when it is desired to maintain an exact (e.g., golden copy) of the source file server to the clone (e.g., to mitigate the effects of cybersecurity attacks or file server failure).
- To maintain the consistency of source to clone, any new file systems that are created on the source server can be copied to the clone server, and any existing file systems deleted at the source are deleted at the clone.

Any new file systems on the clone can be deleted, and any existing file systems on source, if deleted on the clone, are created again on the clone.

When the non-identical option is selected or determined (e.g., via a system 102 later described herein):

The delta data of user file systems are copied to the clone. Users can also select any new file systems that were created at source to be copied on to the clone (e.g., fresh clone of a new file system from source to cloned file server).

File systems that were deleted on source are retained on the clone.

New file systems on the clone are retained, and deleted file systems on the clone are not created by default. A user can choose (e.g., via a GUI herein) to create this file system once again at cloned file server, for instance, as a part of the refresh process.

A user can also perform a selective refresh, for instance, for the file system.

Any changes to the configuration on the cloned file server can be retained during refresh and merged with the source's configuration.

With respect to error handling, as part of handling failure scenarios during clone refresh, a defined rollback process herein can be executed, as required, to keep both clone and production file servers in a consistent state. Example embodiments herein enable this rollback, for instance, via execution of snapshots of the file systems on the clone before proceeding with a clone refresh and restoration of these snapshots, for instance, in case of a failure of a corresponding file server. This defined rollback process can be executed, for instance, for both complete failures and partial failures.

Turning now to FIG. 1, there is illustrated an example, non-limiting system 102 in accordance with one or more example embodiments herein. System 102 can comprise a computerized tool, which can be configured to perform various operations relating to file server clone refresh of file systems and volumes. The system 102 can comprise one or more of a variety of components, such as memory 104, processor 106, bus 108, and/or computer executable components 110. In various embodiments, one or more of the memory 104, processor 106, bus 108, and/or computer executable components 110 can be communicatively or operably coupled (e.g., over a bus or wireless network) to one another to perform one or more functions of the system 102. In various example embodiments, the system 102 can be communicatively coupled to a file server 112 (e.g., a first file server or source file server) and/or a file server 114 (e.g., a second file server or clone file server). In this regard, the file server 114 can be configured to be a clone of the file server 112 (e.g., a source file server). In one or more example embodiments, the file servers herein can comprise respective network attached storage (NAS) servers.

Figure 2:
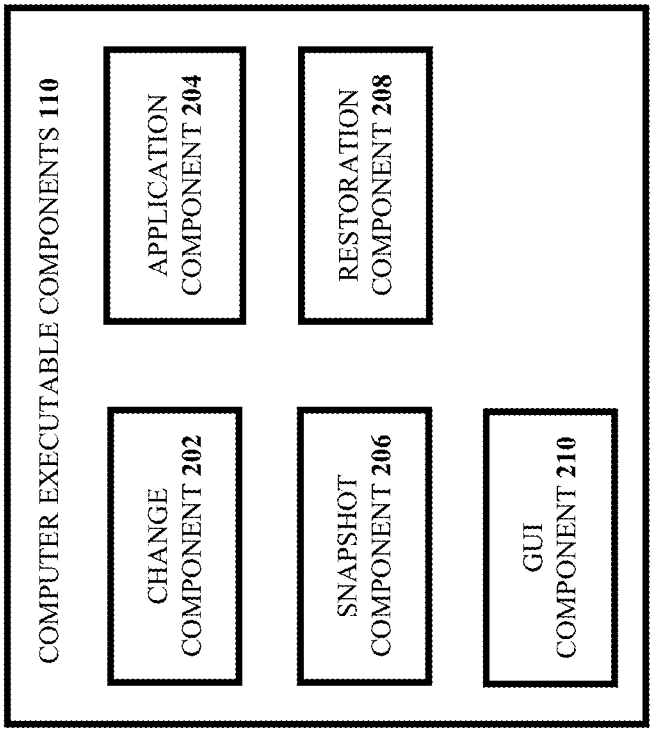
FIG. 2 is a block diagram of a non-limiting example computer executable modules in accordance with one or more example embodiments described herein.

FIG. 2 illustrates a block diagram of example, non-limiting computer executable components 110 that can facilitate file server clone refresh of file systems and volumes in accordance with one or more embodiments described herein. Repetitive description of like elements employed in other embodiments described herein is omitted for sake of brevity. As shown in FIG. 2, the one or more computer executable components 110 can comprise the change component 202, application component 204, snapshot component 206, restoration component 208, and/or GUI component 210. It is noted that, while various components described herein can perform one or more corresponding functions, processes, or actions, the computer executable components 110 and/or system 102 as a whole and/or the processor 106 can be configured to perform one or more of the described functions, processor, or actions.

According to an example embodiment, the change component 202 can, in response to a determination that a first file server (e.g., file server 112) is to be cloned to a second file server (e.g., file server 114), determine changed files between the first file server (e.g., file server 112) and the second file server (e.g., file server 114), and determine configuration changes, applicable to the first file server (e.g., file server 112), relative to a prior cloning of the first file server (e.g., file server 112). To determine such changes, the change component 202 can perform one or more of a timestamp comparison, file size comparison, checksum or hash comparison, binary comparison, content comparison, file attribute and/or metadata comparison, attribute or version comparison, file system journal comparison, or another suitable process for determining changes herein to files and/or configurations. In various example embodiments, the configuration changes can comprise one or more of lightweight directory access protocol (LDAP) configuration changes, server message block (SMB) configuration changes, network file system (NFS) configuration changes, or share or export mapping configuration changes. It is noted that, in various example embodiments, the second file server (e.g., file server 114) can comprise a cloned version of the first file server (e.g., file server 112). Additionally, or alternatively, the configuration changes can comprise client access configuration changes.

In one or more example embodiments, the second file server (e.g., file server 114) can comprise multiple copies from the first file server (e.g., file server 112) and/or multiple copies of the first file server (e.g., file server 112). In this regard, the file server 114 can comprise additional and/or redundant copies of file systems stored on the file server 112, for instance, for development and testing, visualization, certification, data mining, experimentation, data recovery etc. In further embodiments, the file server 114 can comprise additional and/or redundant instances of the entire file server 112, for instance, for development and testing, visualization, certification, data mining, experimentation, data recovery, etc. In one or more example embodiments, the second file server (e.g., file server 114) can comprise an immutable golden copy of the first file server (e.g., file server 112). In this regard, the immutable golden copy of the first file server can be locked for alteration/modification.

According to an example embodiment, the application component 204 can, in response the determining (e.g., via the change component 202) of the changed files, apply changes corresponding to the changed files to the second file server (e.g., file server 114). In various example embodiments, the application component 204 can further, in response to the determining (e.g., via the change component 202) of the configuration changes, apply the configuration changes to the second file server (e.g., file server 114). In this regard, a delta copy of data from source file systems/volumes to cloned file systems/volumes can be performed (e.g., via the change component 202). Performing such a delta copy (e.g., via the change component 202) can comprise, for instance, copying data in which only the differences (e.g., deltas) between the source file server (e.g., file server 112) and cloned file server (e.g., file server 114) are transferred, rather than copying all files.

In various example embodiments, the determination that the first file server (e.g., file server 112) is to be cloned to the second file server (e.g., file server 114) can comprise a determination (e.g., via the change component 202) that the first file server (e.g., file server 112) is to be identically cloned (e.g., an identical refresh) to the second file server (e.g., file server 114). In this regard, the applying of the configuration changes (e.g., via the application component 204) to the second file server (e.g., file server 114) can comprise replacing a second configuration of the second file server (e.g., file server 114) with a first configuration of the first file server (e.g., file server 112). Further, the configuration and the data on the cloned file server (e.g., file server 114) are entirely overwritten, for instance, by the source configuration and data (e.g., from file server 112), while not retaining the configuration changes on the clone (e.g., from file server 114).

In various example embodiments, the determination that the first file server (e.g., file server 112) is to be cloned to the second file server (e.g., file server 114) can comprise a determination (e.g., via the change component 202) that the first file server (e.g., file server 112) is to be non-identically cloned (e.g., non-identical refresh) to the second file server (e.g., file server 114). In this regard, the applying of the configuration changes (e.g., via the application component 204) to the second file server (e.g., file server 114) can comprise merging a second configuration of the second file server (e.g., file server 114) with a first configuration of the first file server (e.g., file server 112). Further, the delta data of file systems from the source (e.g., file server 112) are copied to the clone (e.g., file server 114). Users are enabled to select (e.g., via the GUI component 210) any new file systems that were created at source (e.g., file server 112) to be copied on to the clone (e.g., file server 114) (e.g., fresh clone of a new file system from source to cloned file server).

In various example embodiments, the above operations can further comprise generating (e.g., via the snapshot component 206) a snapshot of the second file server (e.g., file server 114). It is noted that the snapshot can comprise a point-in-time copy of a file server herein. In this regard, the second file server (e.g., file server 114) can be restored (e.g., via the restoration component 208) from a snapshot herein in response to a determination (e.g., by the system 102 (e.g., via the change component 202 or another suitable component)) that the applying (e.g., via the application component 204) of the changes corresponding to the changed files to the second file server (e.g., file server 114) or the applying (e.g., via the application component 204) of the configuration changes to the second file server (e.g., file server 114) resulted in an error. Further in this regard, an error herein can comprise a complete failure of the second file server (e.g., file server 114). Additionally, or alternatively, the error can comprise a partial failure of the second file server (e.g., file server 114).

Figure 3:
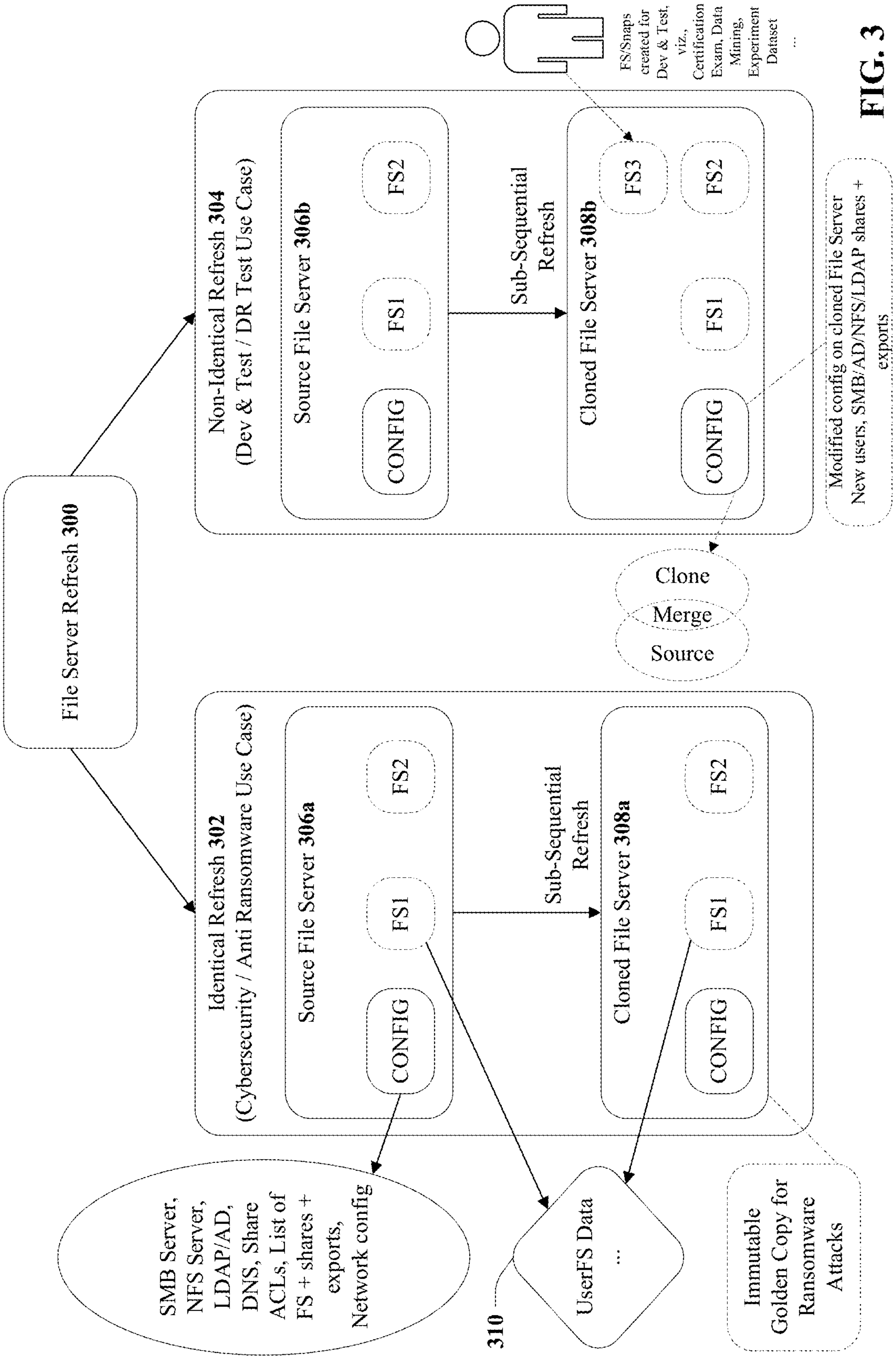
FIG. 3 is a diagram of example file server refresh in accordance with one or more example embodiments described herein.

FIG. 3 is a diagram of example file server refresh 300 in accordance with one or more example embodiments described herein. In various example embodiments, file server refresh 300 herein can be broken down into two processes; identical refresh 302 and non-identical refresh 304. For identical refresh 302, the configuration and the data on the cloned file server 308*a* is entirely overwritten by the source file server 306*a* configuration and data, while not retaining the configuration changes on the cloned file server 308*a*. In various example embodiments, this process can be employable, for instance, when it is desirable to maintain an exact (e.g., golden copy) of source file server (e.g., source file server 306*a*) to the clone (e.g., cloned file server 308*a*) (e.g., to mitigate the effects of cybersecurity attacks). To maintain the consistency of source to cloned file server 308*a*, any new file systems (e.g., FS1, FS2, etc.) that are created on the source file server 306*a* can be copied to the cloned file server 308*a*, and any existing file systems (FS) deleted at source file server 306*a* are deleted at cloned file server 308*a*. Any new file systems on the cloned file server 308*a* can be deleted, and any existing file systems on source file server 306*a*, if deleted on the cloned file server 308*a*, are created again. In various example embodiments, user file system (UserFS) data 310 can be preserved during the clone of source file server 306*a* to the cloned file server 308*a*. In various example embodiments, the config (configuration) can comprise one or more of SMB server configurations, NFS server configurations, LDAP/AD, DNS, share ACLs, list(s) of FS+shares+exports, network configurations, etc. In this regard, the config (configuration) on the cloned file server 308*a* can comprise an immutable golden copy (e.g., for protection against ransomware attacks).

For non-identical refresh 304, the Δ (delta) of user file systems herein (e.g., from among source file server 306*b* and cloned file server 308*b*) are copied to the cloned file server 308*b*. Users are also enabled choose any new file systems that were created at source file server 306*b* to be copied onto the cloned file server 308*b* (e.g., fresh clone of a new file system from source to cloned file server). File systems that were deleted on source file server 306*b* are retained on the cloned file server 308*b*. New file systems on cloned file server 308*b* (e.g., FS3, which can be utilized, for instance, for file system snapshots created for development and testing, visualization, certification, data mining, experimentation, etc.) are retained, and deleted file systems on cloned file server 308*b* are not created by default. In various example embodiments, a user can choose (e.g., via a GUI herein) to create this file system once again at cloned file server 308*b*, for instance, as a part of the refresh. In various example embodiments, a user can also select (e.g., via a GUI herein) a selective refresh, for instance, for the file system or file server. Any changes to the configuration on the cloned file server 308*b* can be retained during refresh and merged with the source file server 306*b* configuration.

Figure 4:
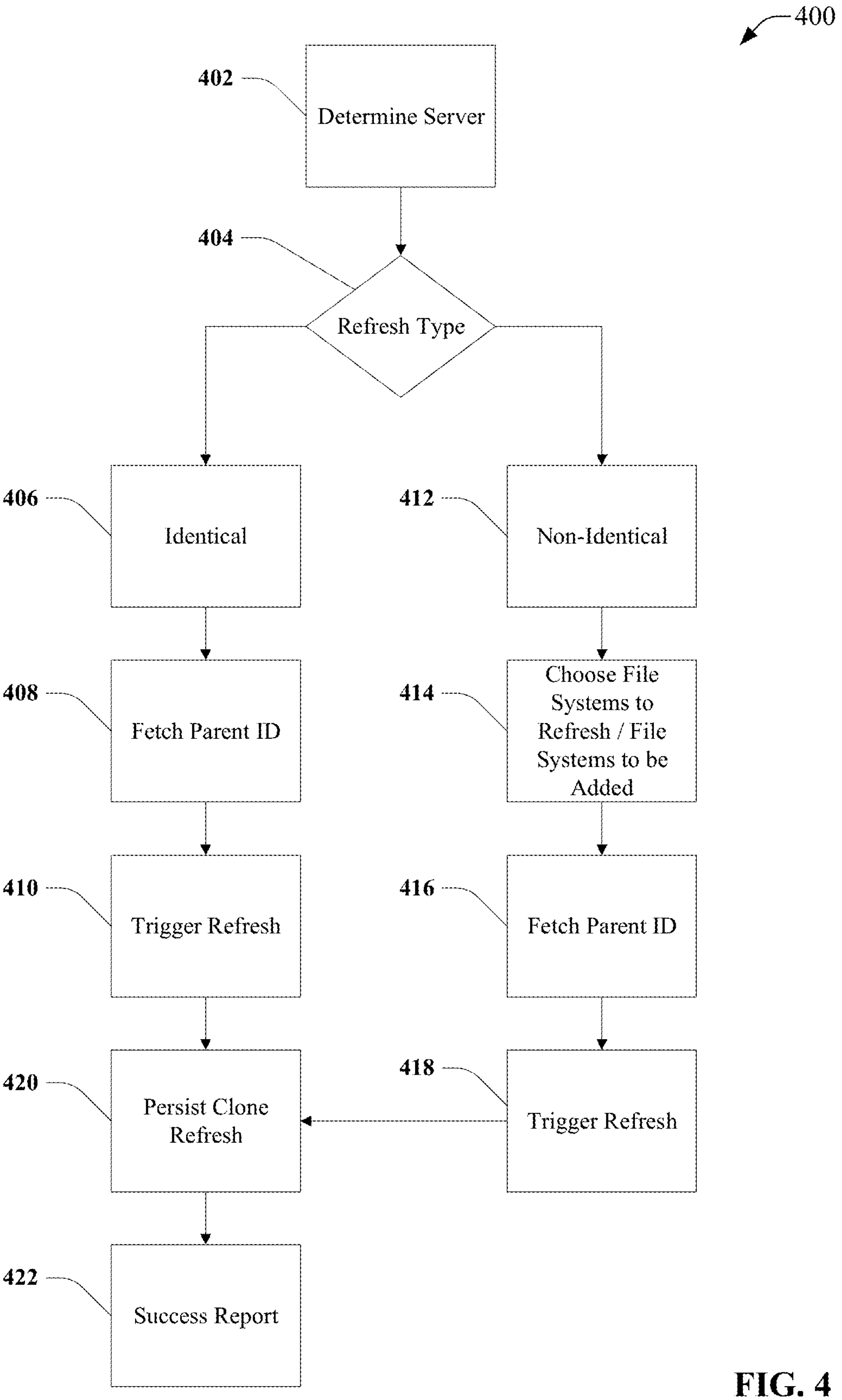
FIG. 4 is a flowchart for a process associated with file server clone refresh of file systems and volumes in accordance with one or more example embodiments described herein.
Figure 5A:
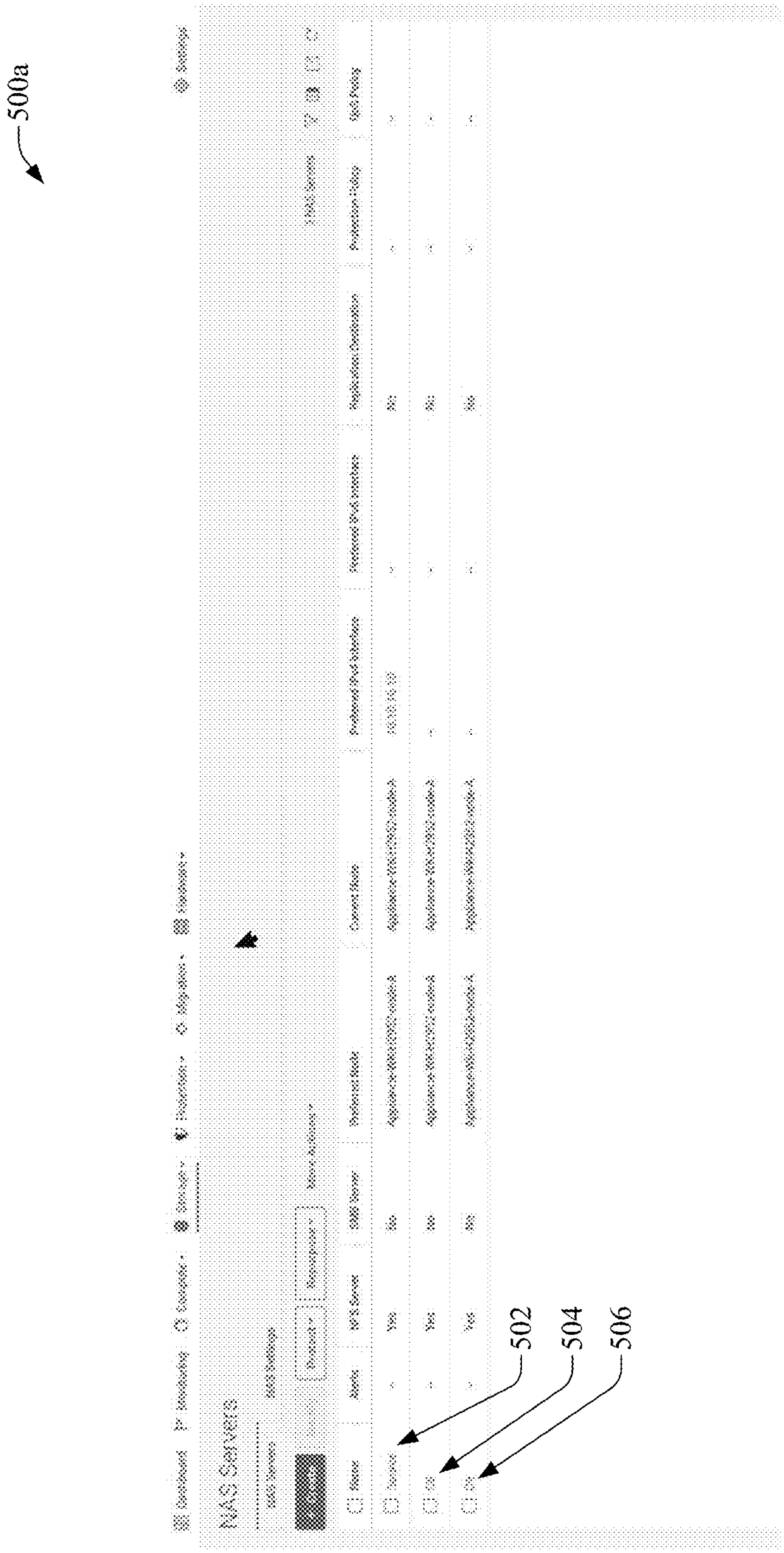
FIGS. 5*a*-5*h* are example graphical user interfaces associated with file server clone refresh of file systems and volumes in accordance with one or more example embodiments described herein.
Figure 5B:
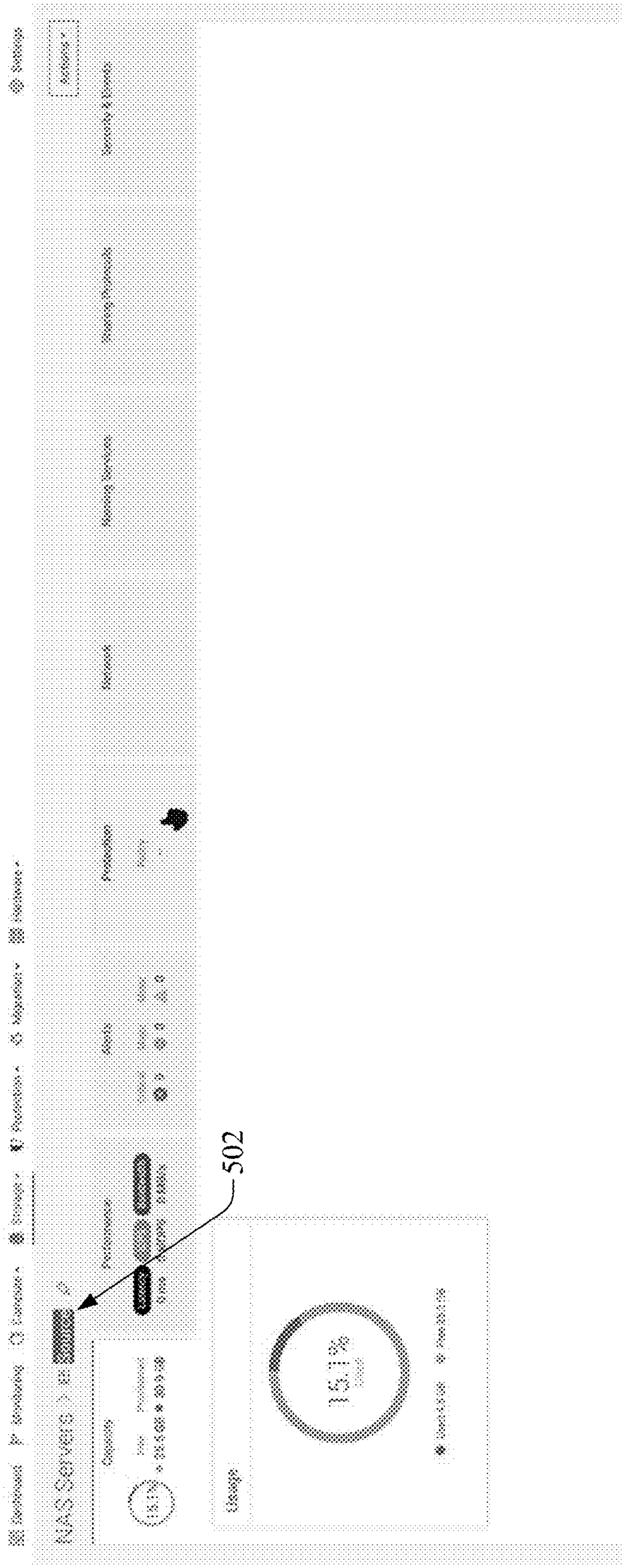
Figure 5C:
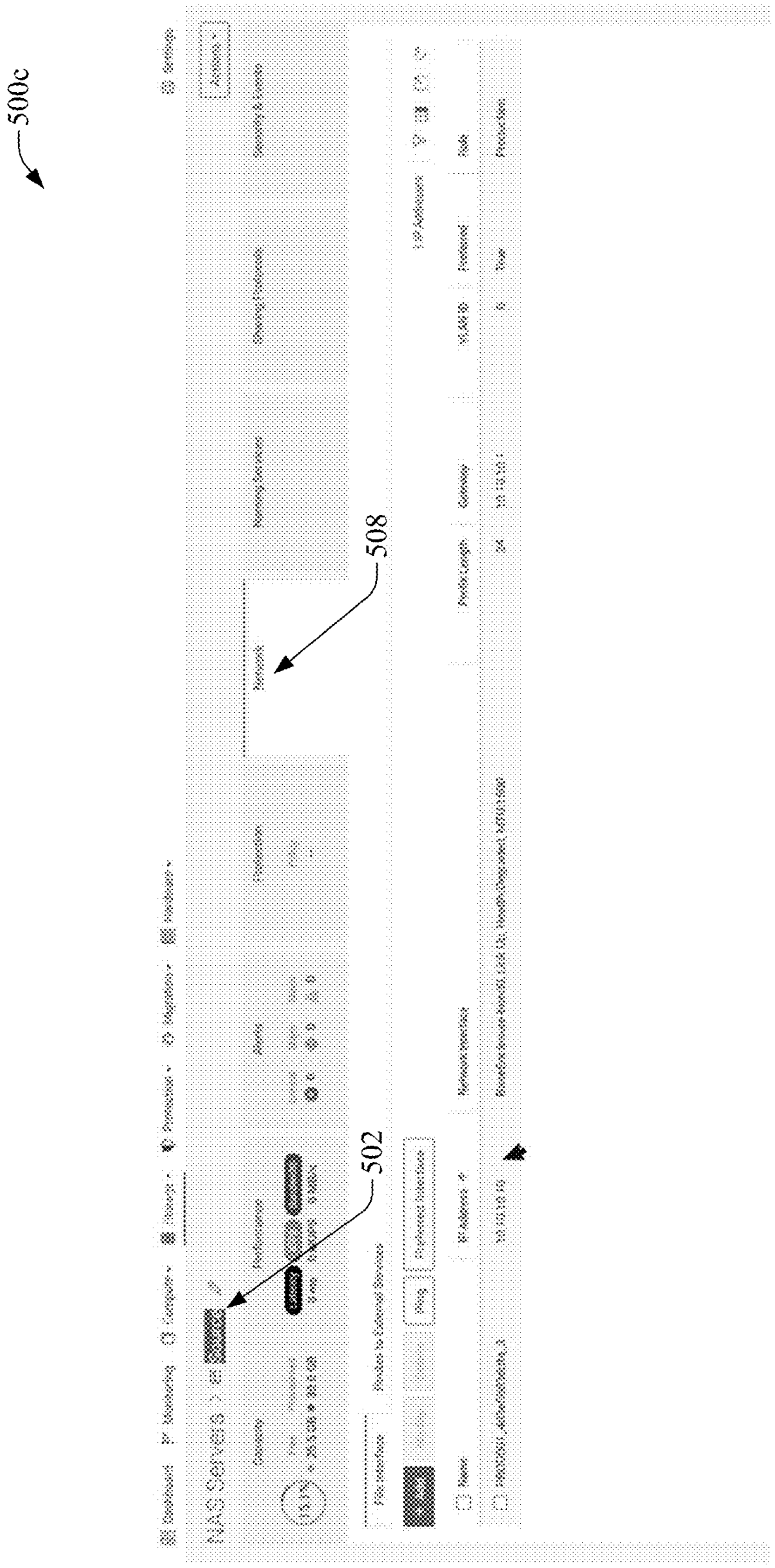
Figure 5D:
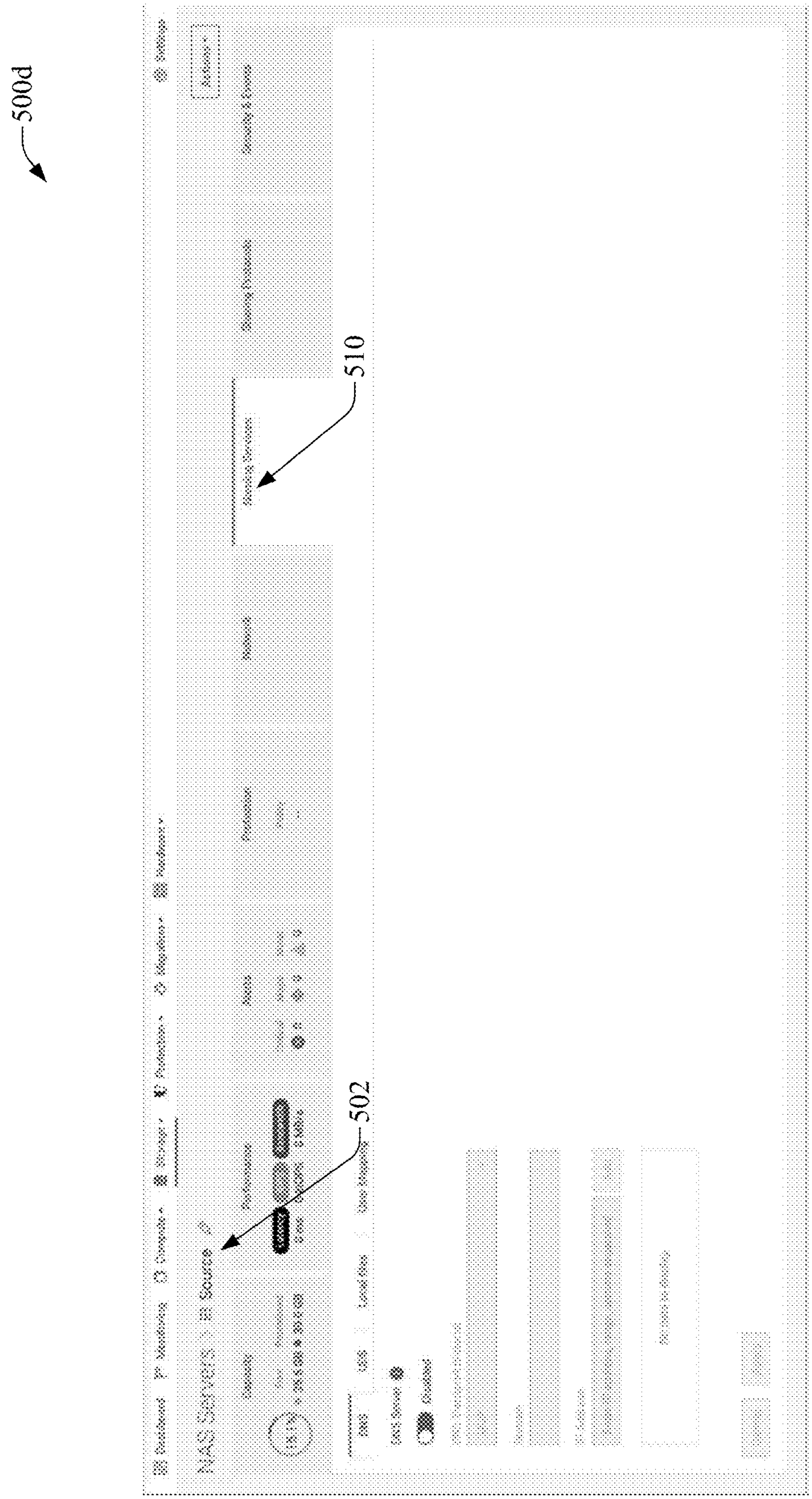
Figure 5E:
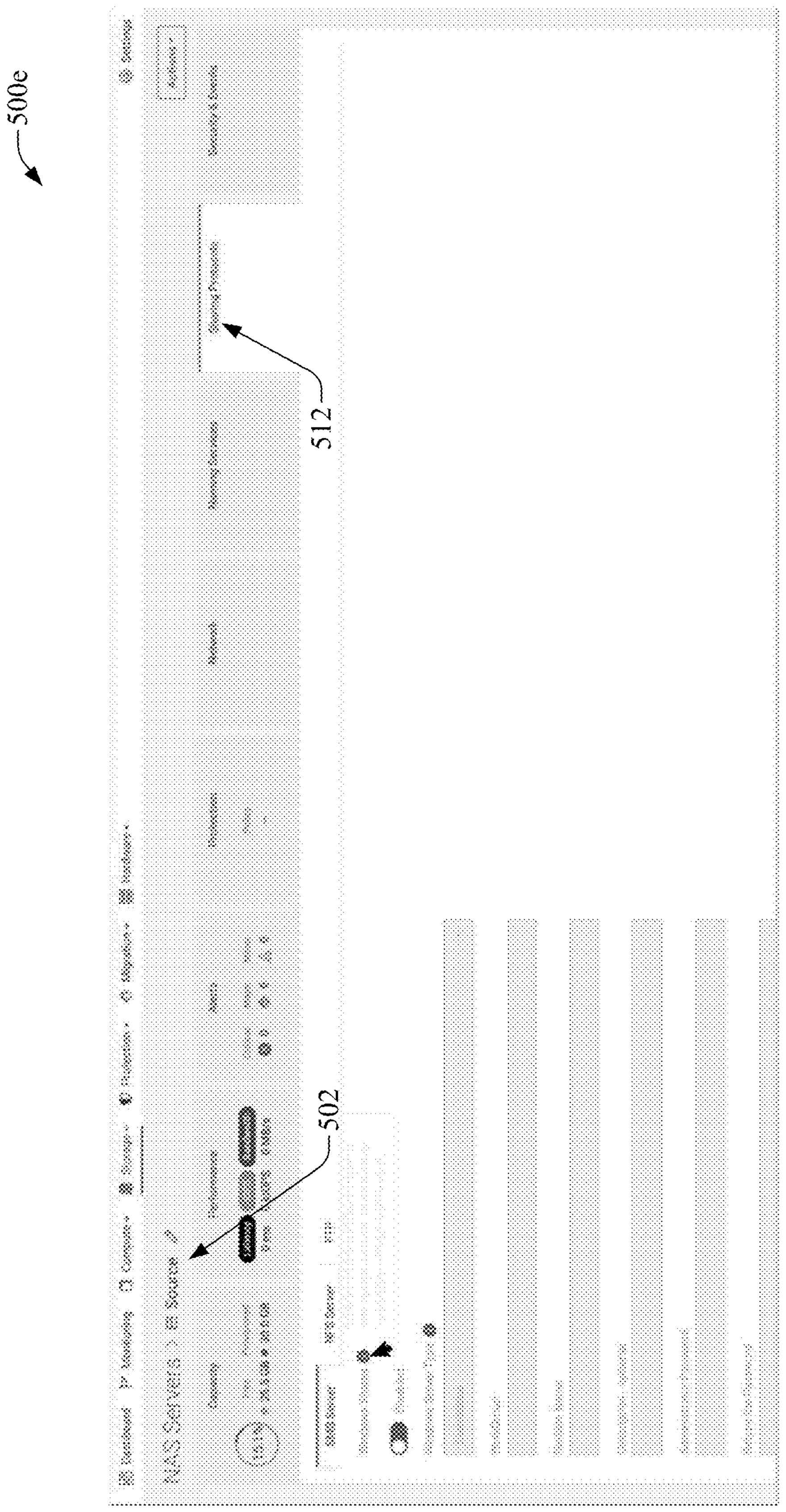
Figure 5F:
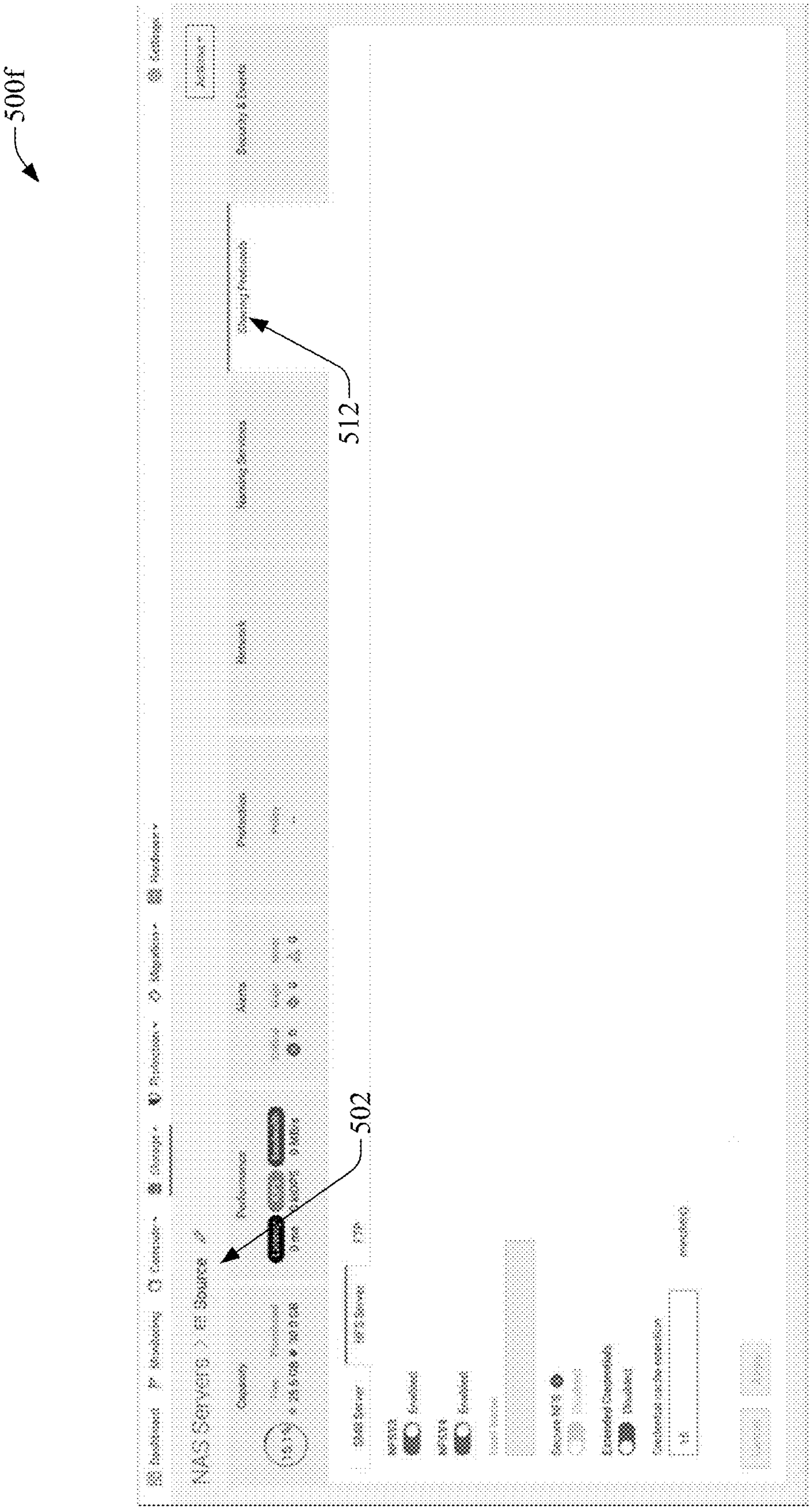
Figure 5G:
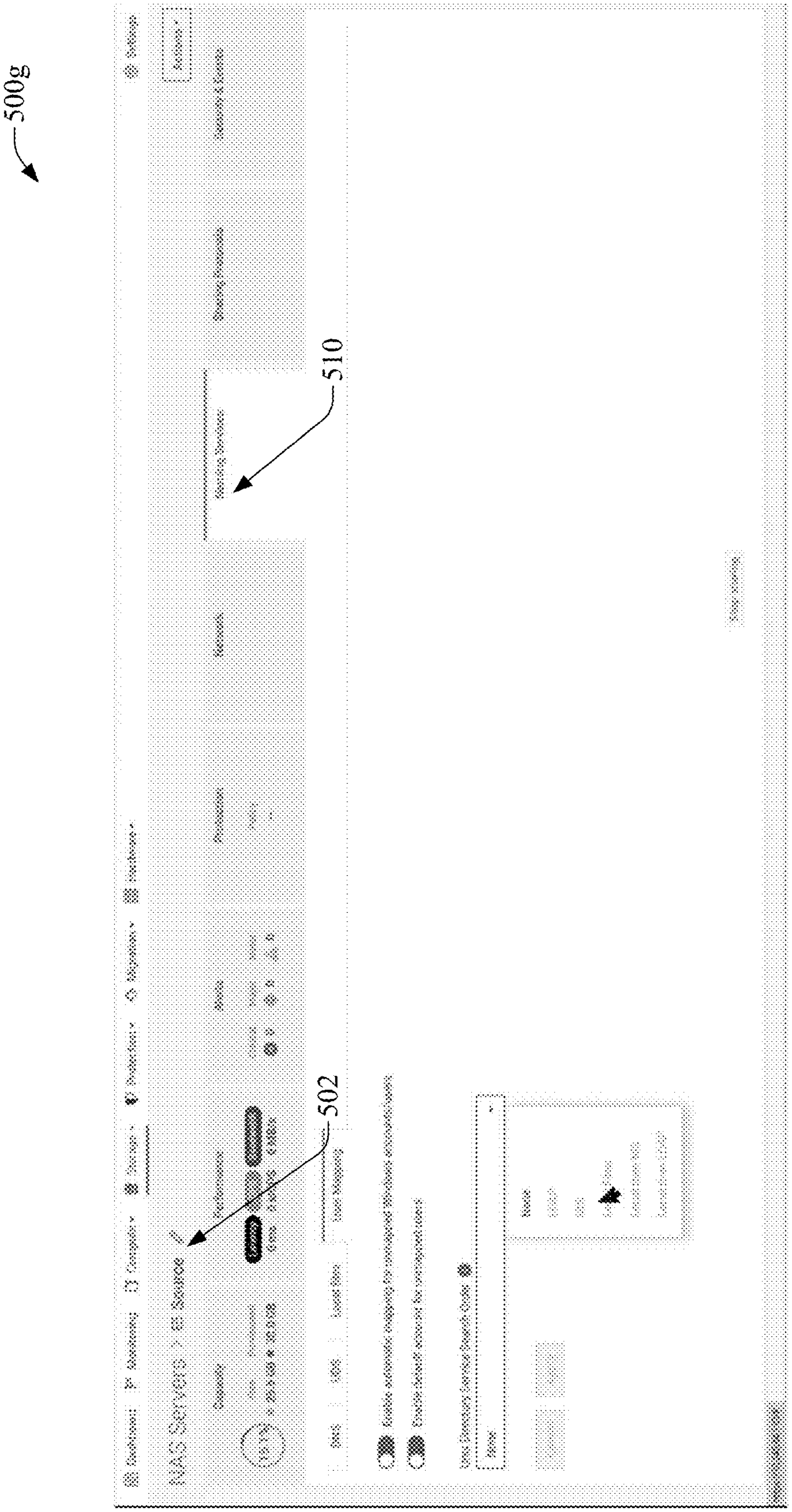
Figure 5H:
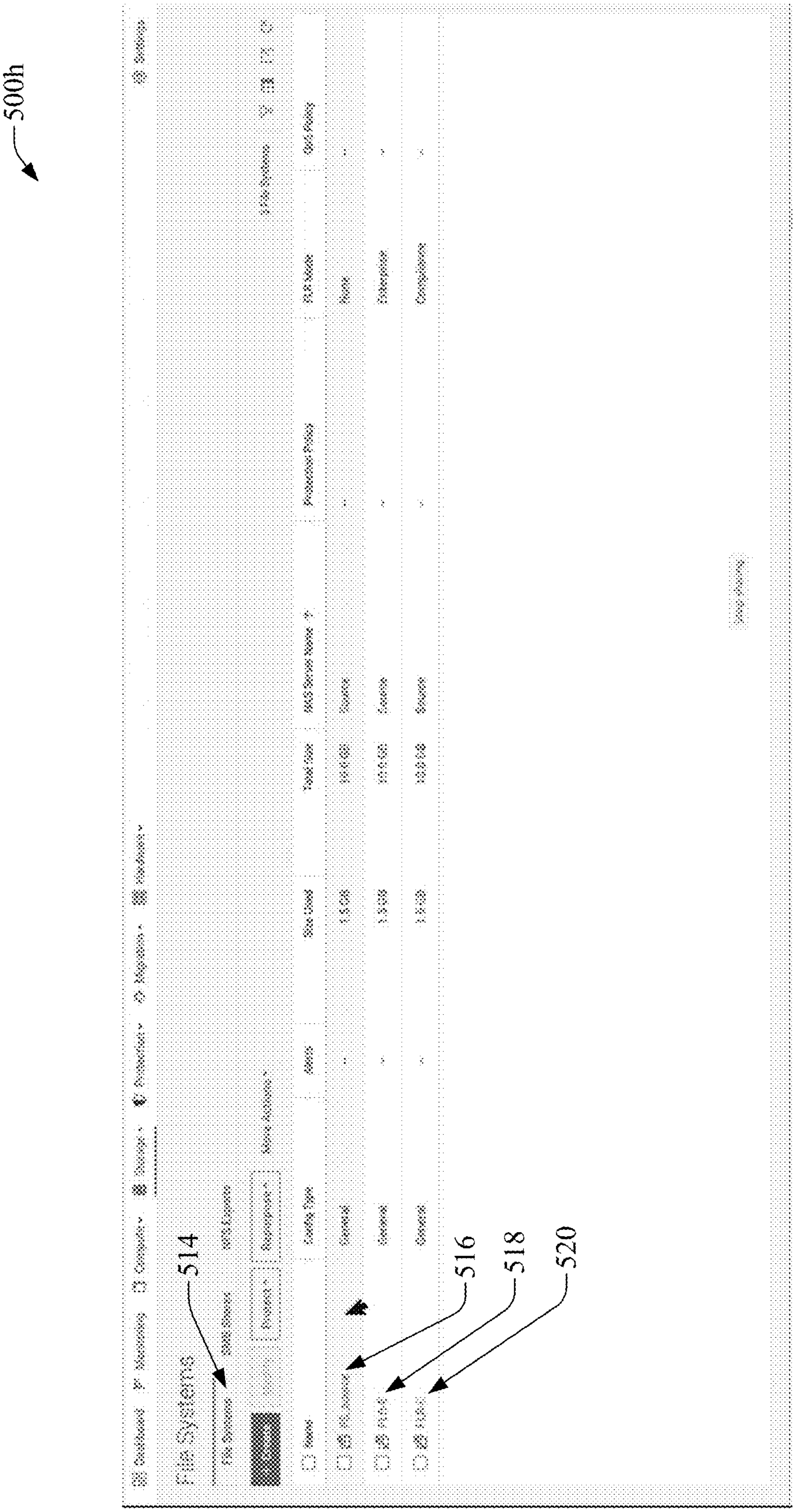

FIG. 4 is a flowchart for a process 400 associated with file server clone refresh of file systems and volumes in accordance with one or more example embodiments described herein. At 402, the system 102 can determine which server (e.g., file server 112) is to be refreshed. Such a determination can be, for instance, based on a received selection (e.g., via a GUI component 210), based on a schedule, or otherwise determined. At 404, the system 102 can determine the refresh type for the server (e.g., file server 112) that is to be refreshed. Such a determination can be, for instance, based on a received selection (e.g., via a GUI component 210), based on a schedule, or otherwise determined. For an identical refresh 406, at 408, the system 102 can fetch the parent ID of the source file server (e.g., file server 112). At 410, the system 102 can trigger the refresh of the source file server to the cloned file server. In this regard, the system 102 can copy file system(s) of the source file server to the cloned file server (e.g., a NAS server). For a non-identical refresh 412, at 414, the file systems to be refreshed from the source file server to the cloned file server can be determined (e.g., via the system 102). Additionally, any new file systems to be added to the cloned file server can be determined (e.g., via the system 102). At 416, the system 102 can fetch the parent ID of the source file server (e.g., file server 112). At 418, the system 102 can trigger the refresh of the source file server. In this regard, the configuration changes on the cloned file server are retained, and the selected file systems are refreshed from the source file server to the cloned file server. At 420, the cloned file server refresh changes can be persisted (e.g., via the system 102). At 422, a success report can be generated (e.g., if the selected refresh type was successful) (e.g., via the system 102) (e.g., via a GUI component 210), else an error report can be generated (e.g., via the system 102) (e.g., via a GUI component 210).

FIGS. 5*a*-5*h* are example graphical user interfaces (e.g., GUIs) associated with file server clone refresh of file systems and volumes in accordance with one or more example embodiments described herein. In GUI 500*a*, the GUI component 210 can generate a list of file servers (e.g., NAS servers) herein. In this nonlimiting example, source file server 502, C8 file server 504, and C9 file server 506 are depicted, though such file servers are only examples and are not to be construed as limiting. In GUI 500*b*, the GUI component 210 can depict available capacity for the source file server 502. In this nonlimiting example, 25.5 GB remain while 4.5 GB are used. In GUI 500*c*, example network configurations 508 are depicted (e.g., via the GUI component 210) for the source file server 502. Here, the internet protocol (IP) address and gateway are shown, for instance which, in an example, can be utilized for NFS exports. In GUI 500*d*, naming services 510 applicable to the source file server 502 are depicted (e.g., via the GUI component 210). In GUIs 500*e* and 500*f*, sharing protocols 512 can be depicted (e.g., via the GUI component 210) for the source file server 502. In GUI 500*g*, naming services 510 are again depicted (e.g., via the GUI component 210) for the source file server 502. Here, user mapping settings are depicted (e.g., via the GUI component 210). In GUI 500*h*, file systems 514 are depicted (e.g., via the GUI component 210). Such file systems can be stored, for instance, on the source file server 502, and can comprise one or more of FS_source 516, FLR-E 518, and/or FLR-C 520.

Figure 6:
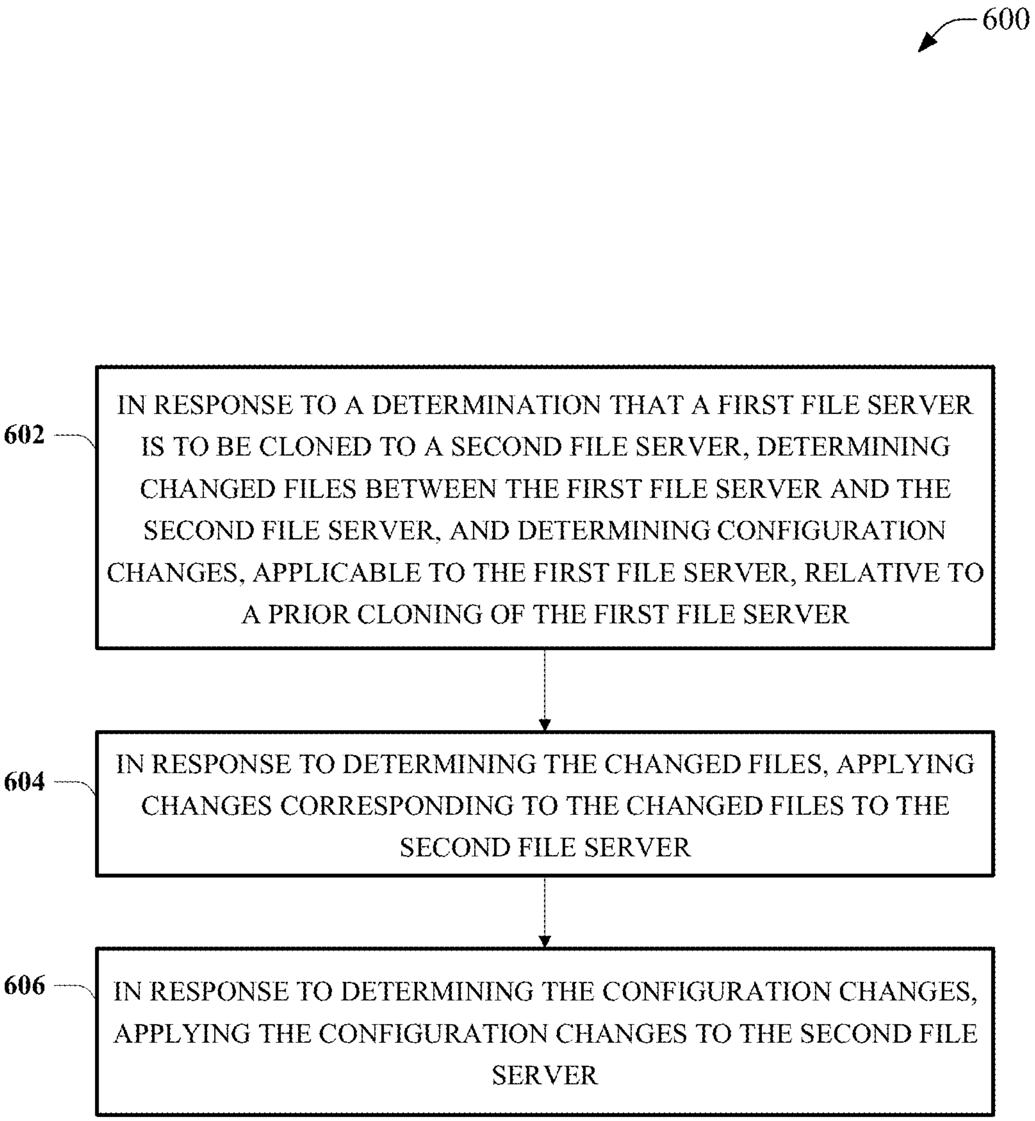
FIG. 6 is a flow diagram for a process associated with file server clone refresh of file systems and volumes in accordance with one or more example embodiments described herein.

FIG. 6 illustrates a flow diagram for a process 600 associated with file server clone refresh of file systems and volumes in accordance with one or more embodiments described herein. At 602, the process 600 can comprise, in response to a determination that a first file server (e.g., file server 112) is to be cloned to a second file server (e.g., file server 114), determining (e.g., via the change component 202) changed files between the first file server (e.g., file server 112) and the second file server (e.g., file server 114), and determining (e.g., via the change component 202) configuration changes, applicable to the first file server (e.g., file server 112), relative to a prior cloning of the first file server (e.g., file server 112). At 604, the process 600 can comprise, in response to determining the changed files, applying (e.g., via the application component 204) changes corresponding to the changed files to the second file server (e.g., file server 114). At 606, the process 600 can comprise, in response to determining the configuration changes, applying (e.g., via the application component 204) the configuration changes to the second file server (e.g., file server 114).

Figure 7:
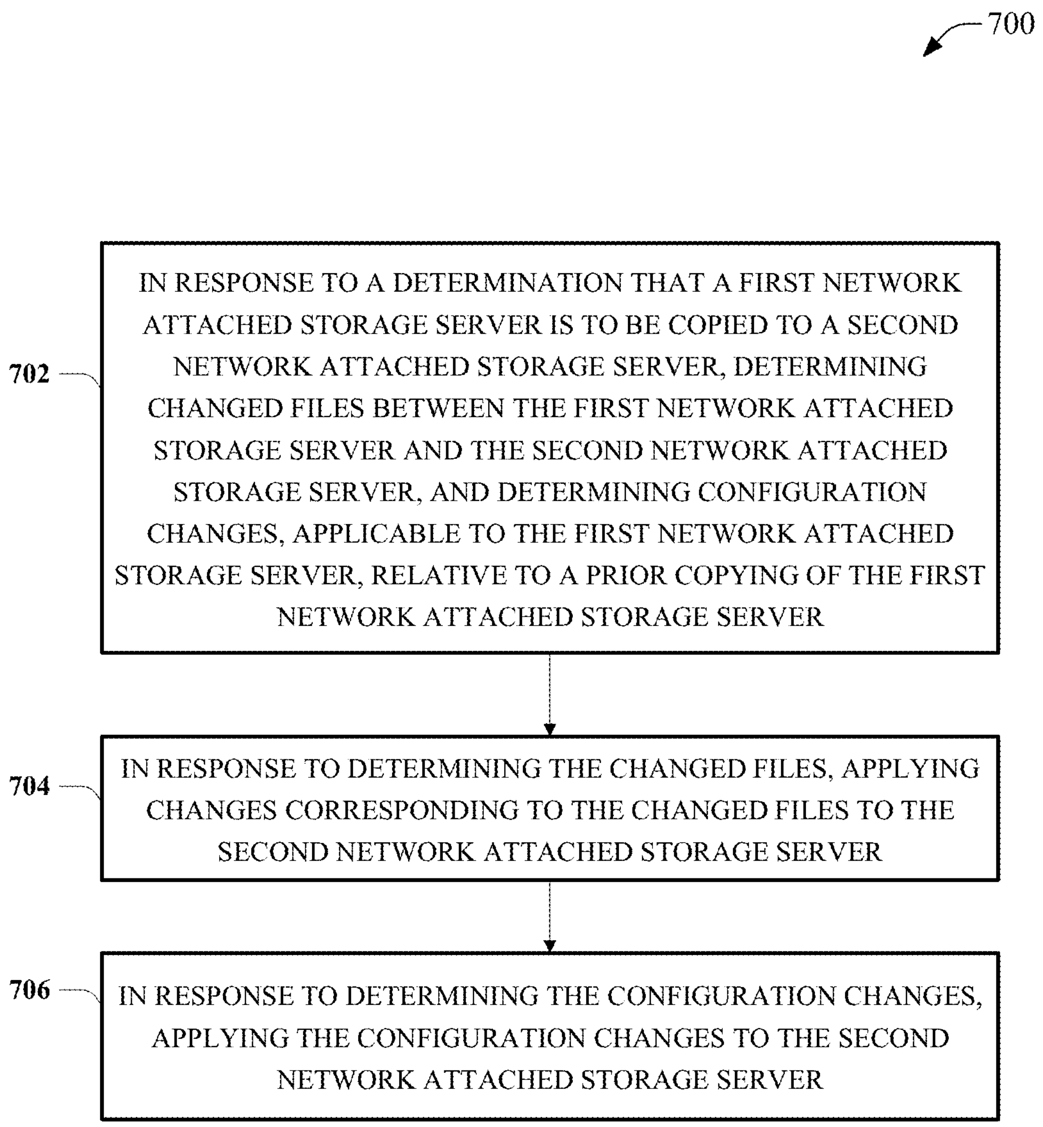
FIG. 7 is a flow diagram for a process associated with file server clone refresh of file systems and volumes in accordance with one or more example embodiments described herein.

FIG. 7 illustrates a flow diagram for a process 700 associated with file server clone refresh of file systems and volumes in accordance with one or more embodiments described herein. At 702, the process 700 can comprise, in response to a determination that a first network attached storage server (e.g., file server 112) is to be copied to a second network attached storage server (e.g., file server 114), determining (e.g., via the change component 202) changed files between the first network attached storage server (e.g., file server 112) and the second network attached storage server (e.g., file server 114), and determining (e.g., via the change component 202) configuration changes, applicable to the first network attached storage server (e.g., file server 112), relative to a prior copying of the first network attached storage server (e.g., file server 112). At 704, the process 700 can comprise, in response to determining the changed files, applying (e.g., via the application component 204) changes corresponding to the changed files to the second network attached storage server (e.g., file server 114). At 706, the process 700 can comprise, in response to determining the configuration changes, applying (e.g., via the application component 204) the configuration changes to the second network attached storage server (e.g., file server 114).

Figure 8:
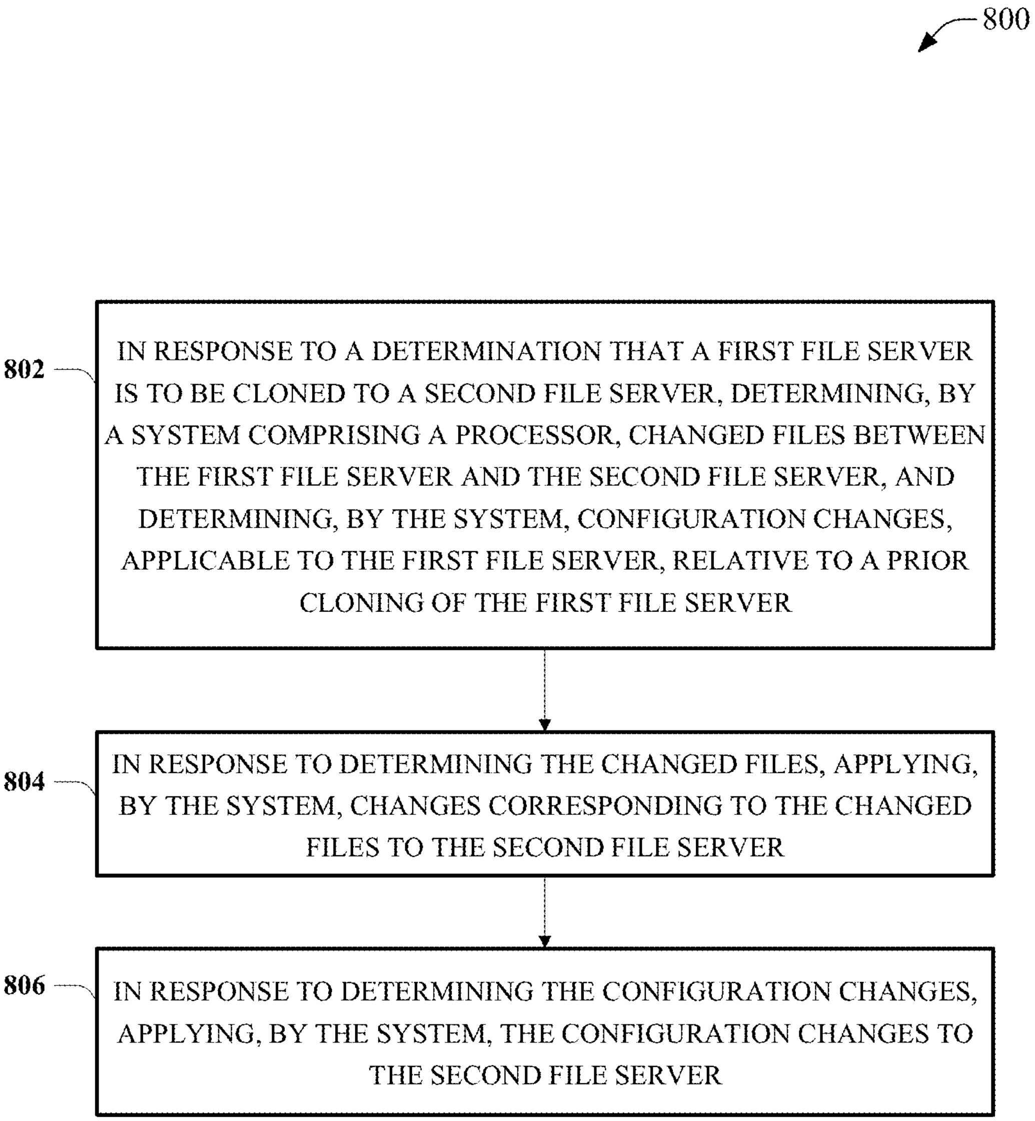
FIG. 8 is a flow diagram for a process associated with file server clone refresh of file systems and volumes in accordance with one or more example embodiments described herein.

FIG. 8 illustrates a flow diagram for a process 800 associated with file server clone refresh of file systems and volumes in accordance with one or more embodiments described herein. At 802, the process 800 can comprise, in response to a determination that a first file server (e.g., file server 112) is to be cloned to a second file server (e.g., file server 114), determining, by a system comprising a processor (e.g., via the change component 202), changed files between the first file server (e.g., file server 112) and the second file server (e.g., file server 114), and determining, by the system (e.g., via the change component 202), configuration changes, applicable to the first file server (e.g., file server 112), relative to a prior cloning of the first file server (e.g., file server 112). At 804, the process 800 can comprise, in response to determining the changed files, applying, by the system (e.g., via the application component 204), changes corresponding to the changed files to the second file server (e.g., file server 114). At 806, the process 800 can comprise, in response to determining the configuration changes, applying, by the system (e.g., via the application component 204), the configuration changes to the second file server (e.g., file server 114).

Figure 9:
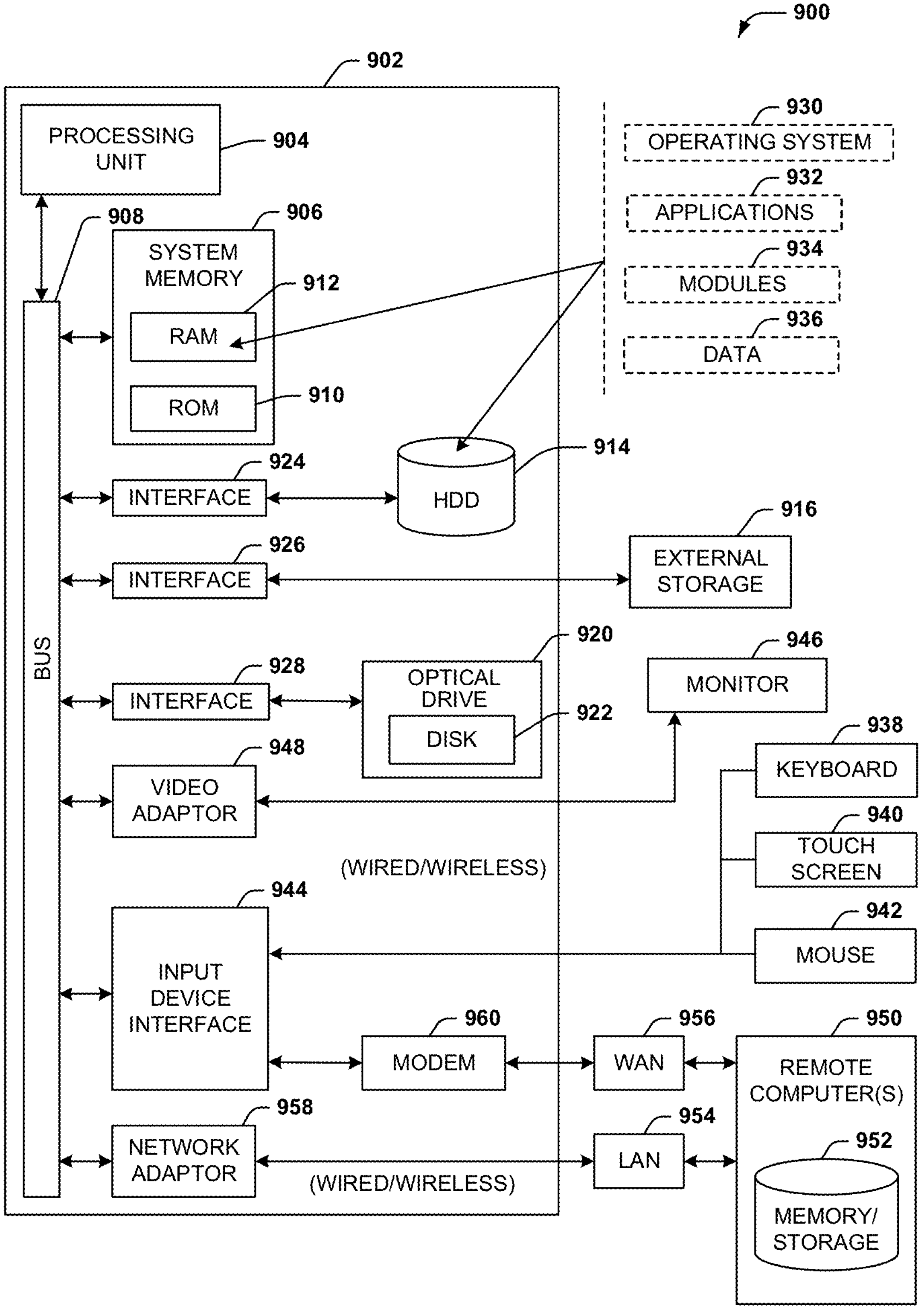
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, modules, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, handheld computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 994 serial port, a game port, a USB port, an IR interface, a BLUETOOTH® interface, etc.

A monitor 946 or other type of display device can also be connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
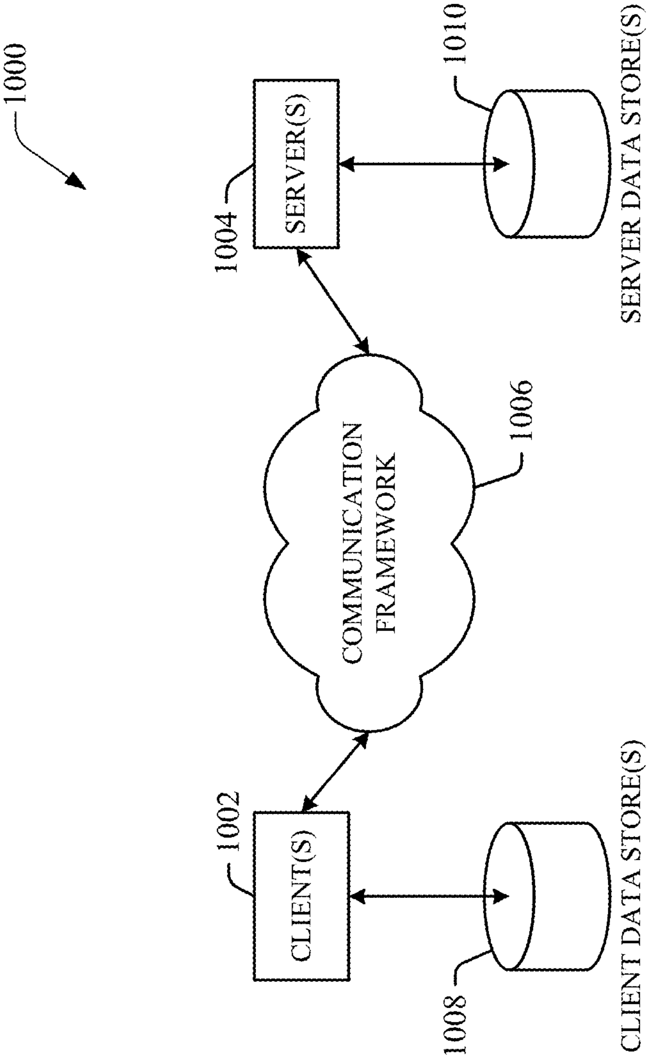
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file, (e.g., encoded media item), to server 1004. Server 1004 can store the file, decode the file, or transmit the file to another client 1002. It is noted that a client 1002 can also transfer uncompressed files to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components, modules, or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, modules, devices, circuits, systems, etc., the terms (including a reference to a "means") used to describe such components or modules are intended to also include, unless otherwise indicated, any structure(s) which performs the specified function of the described component or module (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one processor; and at least one memory that stores executable instructions that, when executed by the at least one processor, facilitate performance of operations, comprising:

in response to a determination that a first file server is to be cloned to a second file server, determining changed files between the first file server and the second file server, and determining configuration changes, applicable to the first file server, relative to a prior cloning of the first file server, wherein the configuration changes comprise lightweight directory access protocol (LDAP) configuration changes;

before applying first changes corresponding to the changed files and the configuration changes to the second file server, generating a snapshot of the second file server;

in response to determining the changed files, applying the first changes corresponding to the changed files to the second file server as part of a non-identical clone of the first file server to the second file server, wherein a first file system that was deleted on the first file server is retained on the second file server, wherein a second file system that was created on the second file server is retained on the second file server, and wherein a third file system that was deleted on the second file server is not re-created on the second file server; and in response to determining the configuration changes, applying the configuration changes to the second file server, wherein second changes to a configuration on the second file server are retained and merged with the configuration changes.

2. The system of claim 1, wherein the determination that the first file server is to be cloned to the second file server comprises a determination that the first file server is to be identically cloned to the second file server, and wherein the applying of the configuration changes to the second file server comprises replacing a second configuration of the second file server with a first configuration of the first file server.

3. The system of claim 1, wherein the determination that the first file server is to be cloned to the second file server comprises a determination that the first file server is to be non-identically cloned to the second file server, and wherein the applying of the configuration changes to the second file server comprises merging a second configuration of the second file server with a first configuration of the first file server.

4. The system of claim 1, wherein the configuration changes further comprise server message block configuration changes, network file system configuration changes, or share or export mapping configuration changes.

5. The system of claim 1, wherein the second file server comprises a cloned version of the first file server.

6. The system of claim 1, wherein the second file server is restored from the snapshot in response to a determination that the applying of the first changes corresponding to the changed files to the second file server or the applying of the configuration changes to the second file server resulted in an error.

7. The system of claim 6, wherein the error comprises a complete failure of the second file server.

8. The system of claim 1, wherein the configuration changes comprise client access configuration changes.

9. The system of claim 1, wherein the second file server comprises multiple copies from the first file server.

10. The system of claim 1, wherein the second file server comprises an immutable golden copy of the first file server.

11. A non-transitory machine-readable medium, comprising executable instructions that, when executed by at least one processor, facilitate performance of operations, comprising:

in response to a determination that a first network attached storage server is to be copied to a second network attached storage server, determining changed files between the first network attached storage server and the second network attached storage server, and determining configuration changes, applicable to the first network attached storage server, relative to a prior copying of the first network attached storage server, wherein the configuration changes comprise lightweight directory access protocol (LDAP) configuration changes;

before applying first changes corresponding to the changed files and the configuration changes to the second network attached storage server, generating a snapshot of the second network attached storage server;

in response to determining the changed files, applying the first changes corresponding to the changed files to the second network attached storage server as part of a non-identical copy of the first network attached storage server to the second network attached storage server, wherein a first file system that was deleted on the first network attached storage server is retained on the second network attached storage server, wherein a second file system that was created on the second network attached storage server is retained on the second network attached storage server, and wherein a third file system that was deleted on the second network attached storage server is not re-created on the second network attached storage server; and in response to determining the configuration changes, applying the configuration changes to the second network attached storage server, wherein second changes to a configuration on the second network attached storage server are retained and merged with the configuration changes.

12. The non-transitory machine-readable medium of claim 11, wherein the determination that the first network attached storage server is to be copied to the second network attached storage server comprises a determination that the first network attached storage server is to be identically copied to the second network attached storage server, and wherein the applying of the configuration changes to the second network attached storage server comprises replacing a second configuration of the second network attached storage server with a first configuration of the first network attached storage server.

13. The non-transitory machine-readable medium of claim 11, wherein the determination that the first network attached storage server is to be copied to the second network attached storage server comprises a determination that the first network attached storage server is to be non-identically copied to the second network attached storage server, and wherein the applying of the configuration changes to the second network attached storage server comprises merging a second configuration of the second network attached storage server with a first configuration of the first network attached storage server.

14. The non-transitory machine-readable medium of claim 11, wherein the configuration changes further comprise at least one of server message block configuration changes, network file system configuration changes, or share or export mapping configuration changes.

15. The non-transitory machine-readable medium of claim 11, wherein the second network attached storage server comprises an exact copy of the first network attached storage server.

16. A method, comprising:

in response to a determination that a first file server is to be cloned to a second file server, determining, by a system comprising a processor, changed files between the first file server and the second file server, and determining, by the system, configuration changes, applicable to the first file server, relative to a prior cloning of the first file server, wherein the configuration changes comprise lightweight directory access protocol (LDAP) configuration changes;

before applying first changes corresponding to the changed files and the configuration changes to the second file server, generating, by the system, a snapshot of the second file server;

in response to determining the changed files, applying, by the system, the first changes corresponding to the changed files to the second file server as part of a non-identical clone of the first file server to the second file server, wherein a first file system that was deleted on the first file server is retained on the second file server, wherein a second file system that was created on the second file server is retained on the second file server, and wherein a third file system that was deleted on the second file server is not re-created on the second file server; and in response to determining the configuration changes, applying, by the system, the configuration changes to the second file server, wherein second changes to a configuration on the second file server are retained and merged with the configuration changes.

17. The method of claim 16, wherein the second file server is restored from the snapshot in response to a determination that the applying of the first changes corresponding to the changed files to the second file server or the applying of the configuration changes to the second file server resulted in an error.

18. The method of claim 17, wherein the error comprises a partial failure of the second file server.

19. The method of claim 16, wherein the configuration changes comprise client access configuration changes.

20. The method of claim 16, wherein the second file server comprises at least two copies of the first file server.

* * * * *